(12) United States Patent
Mori et al.

(10) Patent No.: US 9,668,608 B2
(45) Date of Patent: Jun. 6, 2017

(54) BEVERAGE MACHINE WITH REMOVABLE LIQUID SUPPLY RESERVOIR

(75) Inventors: Peter Mori, Walperswil (CH); Gilles Gavillet, Ursy (CH)

(73) Assignee: Nestec S.A., Vevey (CH)

( * ) Notice: Subject to any disclaimer, the term of this patent is extended or adjusted under 35 U.S.C. 154(b) by 515 days.

(21) Appl. No.: 13/522,538

(22) PCT Filed: Jan. 21, 2011

(86) PCT No.: PCT/EP2011/050812
§ 371 (c)(1),
(2), (4) Date: Jul. 17, 2012

(87) PCT Pub. No.: WO2011/089210
PCT Pub. Date: Jul. 28, 2011

(65) Prior Publication Data
US 2012/0285966 A1    Nov. 15, 2012

(30) Foreign Application Priority Data
Jan. 21, 2010  (EP) ..................................... 10151317

(51) Int. Cl.
*A47J 31/44*        (2006.01)
*A47J 31/36*        (2006.01)

(52) U.S. Cl.
CPC ........... *A47J 31/4403* (2013.01); *A47J 31/36* (2013.01)

(58) Field of Classification Search
USPC .... 99/293–298, 302 R, 307, 373.1; 126/369, 126/371
See application file for complete search history.

(56) References Cited

U.S. PATENT DOCUMENTS

| 4,175,516 | A | * | 11/1979 | Savage | A01K 5/025 |
| | | | | | 119/62 |
| 4,207,982 | A | * | 6/1980 | Maxwell | B65D 47/068 |
| | | | | | 206/459.1 |
| 4,609,124 | A | * | 9/1986 | Malloy | A47G 19/2205 |
| | | | | | 220/260 |
| 4,744,614 | A | * | 5/1988 | Gombosi | A01K 97/04 |
| | | | | | 206/315.11 |
| 4,793,070 | A | * | 12/1988 | Hohner | G01B 5/16 |
| | | | | | 33/1 BB |

(Continued)

FOREIGN PATENT DOCUMENTS

EP           126787 A1     1/2003
EP          1380243 A1     1/2004

(Continued)

OTHER PUBLICATIONS

Translation of WO 2005/072581.*

(Continued)

*Primary Examiner* — David Angwin
*Assistant Examiner* — Frederick Calvetti
(74) *Attorney, Agent, or Firm* — K&L Gates LLP

(57) ABSTRACT

A beverage preparation machine (1) comprises: a beverage preparation module (2); a removable reservoir (4) assembled to the beverage preparation module and disassemblable therefrom for removal; and a lid (41) for covering the reservoir. The lid has a fastening arrangement (46) for securing the reservoir against the beverage preparation module when the reservoir is assembled to the module.

14 Claims, 6 Drawing Sheets

(56) References Cited

U.S. PATENT DOCUMENTS

| | | | | |
|---|---|---|---|---|
| 5,379,682 | A * | 1/1995 | Andrew et al. | 99/281 |
| 5,941,412 | A * | 8/1999 | Mahoney | B65D 43/166 220/845 |
| 6,107,576 | A * | 8/2000 | Morton | H02G 3/0418 174/101 |
| 6,572,909 | B1 * | 6/2003 | Bagwell | B65D 43/162 206/216 |
| 6,742,666 | B1 * | 6/2004 | Bried | B65D 47/0833 215/235 |
| 6,990,891 | B2 * | 1/2006 | Tebo, Jr. | A47J 31/0647 99/295 |
| 7,013,794 | B2 * | 3/2006 | Rolland | 99/284 |
| 7,131,369 | B2 * | 11/2006 | Gantt | A47J 31/0668 99/289 R |
| 7,461,586 | B2 * | 12/2008 | Garman | A47J 31/057 222/146.5 |
| 2005/0263637 | A1 * | 12/2005 | Oliver | A47J 42/56 241/282 |
| 2006/0090653 | A1 * | 5/2006 | McDuffie | A47J 31/4407 99/279 |
| 2007/0017379 | A1 * | 1/2007 | Takizawa et al. | 99/279 |
| 2010/0233338 | A1 * | 9/2010 | Garcia | A47J 31/4403 426/431 |
| 2013/0014647 | A1 * | 1/2013 | Mori et al. | 99/279 |

FOREIGN PATENT DOCUMENTS

| | | |
|---|---|---|
| EP | 1253844 B1 | 2/2007 |
| EP | 1809151 A2 | 7/2007 |
| FR | 2316901 * | 2/1977 |
| FR | 2806606 * | 9/2001 |
| JP | 5679223 | 6/1981 |
| JP | 5799640 | 6/1982 |
| WO | 01/72189 | 10/2001 |
| WO | 2005/072581 | 8/2005 |
| WO | 2009/074550 A2 | 6/2009 |
| WO | 2009/074553 A2 | 6/2009 |
| WO | WO2009074559 * | 6/2009 |
| WO | 2010/015427 A1 | 2/2010 |
| WO | 2011/095511 A1 | 8/2011 |

OTHER PUBLICATIONS

Written Opinion and International Search Report issued Jun. 7, 2011 for corresponding Intl. Appln. No. PCT/EP2011/086960.
Japanese Office Action issued in JP Patent Application 2012-549367. Mailed Oct. 6, 2014. 4 pages.

* cited by examiner

BEVERAGE MACHINE WITH REMOVABLE LIQUID SUPPLY RESERVOIR

CROSS REFERENCE TO RELATED APPLICATIONS

The present application is a National Stage of International Application No. PCT/EP2011/050812, filed on Jan. 21, 2011, which claims priority to European Patent Application No. 10151317.4, filed on Jan. 21, 2010, the entire contents of which are being incorporated herein by reference.

FIELD OF THE INVENTION

The present invention concerns a beverage preparation machine that has a removable liquid supply reservoir, in particular the assembly of such a supply reservoir to the beverage preparation machine.

For the purpose of the present description, a "beverage" is meant to include any liquid food, such as tea, coffee, hot or cold chocolate, milk, soup, baby food, etc. . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir.

The beverage preparation machine typically includes a housing containing a beverage processing module and a liquid reservoir that is removably connected to the housing and in fluid communication with the beverage processing module. Examples of such beverage preparation machines are disclosed in EP 1 267 687, WO 2009/074553 and PCT/EP09/053139.

EP 1 267 687 discloses a beverage machine having a vertically extending water reservoir that is pivotable about a vertical axis and fixed against the machine's housing by an upper hook part formed by the rim of the reservoir and engaging with a hook retainer formed in the housing. Furthermore, the reservoir is covered with a removable lid extending over part of the machine's housing. Further beverage machines with a water reservoir and a lid are disclosed in FR 2 316 901 and in WO 2005/072581.

SUMMARY OF THE INVENTION

A preferred object of the present invention is to provide a beverage preparation machine with a simple arrangement for securing a liquid reservoir to a beverage preparation module.

Therefore, the invention relates to a beverage preparation machine that includes:
a beverage preparation module, in particular a module for preparing a beverage by circulating a liquid via a flavouring ingredient such a pre-portioned ingredient contained in a capsule; and
a removable reservoir assembled to the beverage preparation module and disassemblable therefrom for removal, in particular a reservoir for storing liquid and supplying such liquid to the module; and
a lid for covering the reservoir.

The beverage preparation module may include a pump for circulating liquid from the reservoir to a beverage outlet of the beverage preparation module. The pump may be a reciprocating piston pump or a rotary pump.

For instance, the machine is a coffee, tea, chocolate or soup preparation machine, such as a self-contained table-top machine that can be electrically connected to the mains, e.g. at home or in an office. In particular, the machine is arranged for preparing within the ingredient processing arrangement a beverage by passing hot or cold water or another liquid through a capsule containing an ingredient of the beverage to be prepared, such as ground coffee or tea or chocolate or cacao or milk powder.

For example, the preparation machine comprises: an ingredient processing arrangement including one or more of a liquid reservoir, liquid circulation circuit, a heater, a pump and a beverage preparation unit arranged to receive ingredient capsules for extraction and evacuate capsules upon extraction; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550, WO 2009/130099 and PCT/EP09/053139.

The beverage preparation module may include one or more of the following components:
a) a brewing unit for receiving an ingredient of this beverage, in particular a pre-portioned ingredient supplied within a capsule, and for guiding an incoming flow of liquid, such as water, through said ingredient to a beverage outlet;
b) an in-line heater, such as a thermoblock, for heating this flow of liquid to be supplied to the brewing unit;
c) a pump for pumping this liquid through the in-line heater;
d) one or more fluid connecting members for guiding this liquid from a source of liquid, such as a tank of liquid, to the beverage outlet;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151.

In accordance with the invention, the lid has a fastening arrangement for securing the reservoir against the beverage preparation module when the reservoir is assembled to the module.

Hence, instead of having a distinct fastening arrangement for fastening the reservoir against the beverage preparation module, the reservoir's lid incorporates itself fastening means for this purpose.

Typically, the beverage preparation module comprises an outer housing, the fastening arrangement fastening the lid to the outer housing to secure the reservoir against the housing when assembled to the module. Normally, the machine has a front face bearing a beverage outlet for dispensing the beverage into a user-cup or user-mug located therebelow, the housing having a rear face opposite the front face and/or a lateral face adjacent the front face, the reservoir extending over at least part of the rear face or lateral face. For instance, the reservoir extends vertically and/or horizontally, generally coextensively with a housing face.

The lid may be: connected to the reservoir when the reservoir is assembled to the beverage preparation module; and disconnected or disconnectable from the reservoir when the reservoir is removed from the beverage preparation module. In this context, disconnection is meant to be non-desctructive and regularly achievable by a user of the machine during normal use.

Alternatively, the lid is permanently fixed to the reservoir, the lid being in particular integral with the reservoir or assembled thereto e.g. by welding, gluing, force-fitting, screws, rivets, etc. . . . In this context, permanent fixing means that the lid is not intended to be removed during normal use, removal being burdensome or even destructive. In particular, removal of the lid from the reservoir serves no function of normal fastening or unfastening for securing the reservoir against de beverage preparation module.

The lid can be: fastened to the beverage preparation module for securing the reservoir to the beverage preparation module; and unfastened from the beverage preparation module for removing the reservoir from the beverage preparation module.

The beverage preparation module and the fastening arrangement of the lid may include disconnectable interconnecting parts. The interconnecting parts can be connected by closing the reservoir with the lid and disconnected by opening the reservoir by moving the lid.

For instance, the lid has a front portion covering the reservoir and a rear portion bearing the fastening arrangement. The lid can be pivotable between its front and rear portions, in particular over an edge of the reservoir, to connect and disconnect the interconnecting parts. The disconnectable interconnecting parts may include one or more hooks and hook-retainers on the lid and on the beverage preparation module, respectively, or vice versa. The hook-retainer(s) may include slots for the hook(s).

A top part of the beverage preparation module may have an arrangement, e.g. a hook-retainer or a hook, for cooperating with the fastening arrangement of the lid, e.g. a hook or a hook-retainer. For instance, the reservoir extends vertically from a bottom part of the beverage preparation machine to the top part of the module.

The fastening arrangement of the lid may include a snap or any other disconnectable mechanical connection.

In an embodiment, the beverage preparation module has an arrangement for holding the removable reservoir. The lid is typically arranged to lock the assembly of the removable reservoir when held by the holding arrangement of the beverage preparation module. In such a case, the lid does not need to significantly support mechanically the assembly from a perspective of constraints between the beverage preparation module and the removable reservoir. In this case, the locking lid merely prevents unwanted disassembly of the assembled and supported removable reservoir.

Hence, the holding arrangement may be configured to support the main constraints between the reservoir and the beverage preparation module. In such a configuration, the fastening arrangement does not support the main constraints between the reservoir and the beverage preparation module but merely locks the assembly of the reservoir and beverage preparation module.

The holding arrangement may comprise a support member for supporting a bottom part of the removable reservoir by the beverage preparation module, such as a support base and/or a support platform of the beverage preparation module extending underneath the reservoir.

The holding arrangement may include a secondary member for maintaining the removable reservoir against the support member. The secondary member can be located in or on an upper part of the reservoir when assembled to the beverage preparation machine. The secondary member may comprise a protrusion of the beverage preparation module cooperating with an opening, such as a recess or cut-out, of the reservoir or vice versa. The opening and protrusion may be in the form of cooperating hole and plug. Such an opening is in particular located between the reservoir and the lid. For example, the recess forms a cut-out in the reservoir and is covered by the lid. This kind of secondary member may be used to urge the reservoir against the support member and/or to prevent transverse movements of the reservoir relative to the support member. For instance, a pair of such secondary members is used to stabilise the reservoir on the support member. As mentioned above, the lid may simply lock the reservoir between the support member and the secondary member(s).

Typically, a bottom part of the beverage preparation module and a bottom part of the reservoir have disconnectably connected fluid connectors when the reservoir is assembled to the beverage preparation module.

The beverage preparation module and the reservoir can be connected by a vibration-barrier mechanical connection for inhibiting or preventing propagation of vibrations from the beverage preparation module to the reservoir. Hence, the operative configuration of such a machine, e.g. standing on top of a table or a shelf or in or on a cupboard or like support, in particular a generally flat and horizontal support, is such as to avoid any vibration-propagating rigid connection between the vibrating beverage preparation module and the liquid reservoir during use. In particular, the machine comprises no rigid chassis or base that extends from the vibrating module to the reservoir and that communicates such vibrations to the reservoir. Moreover, the machine has no rigid fastening means securing the reservoir to the beverage preparation module capable to communicate vibrations to the reservoir during use.

Hence, the liquid reservoir, e.g. a water tank, can be generally shielded from vibrations caused by the beverage preparation module. It follows that the reservoir is inhibited from transmitting or reinforcing vibrations and related noise. Overall noise and vibration level of the beverage preparation machine is thus reduced.

The liquid reservoir can be designed such that it stands independently of the beverage preparation module on a support during use. The interface between the liquid reservoir and the beverage preparation module may be elastic, e.g. made of silicone, to avoid propagation of vibrations from the module to the reservoir.

In an embodiment, the reservoir has a foot arranged to rest during use on an external support, in particular distinct form the beverage preparation machine, such as a table top, that is unsecured to the beverage preparation module. The beverage preparation module typically has a bottom, in particular having one or more vibration-dampeners such as rubber feet and/or bumpers, that is arranged to rest on such an external support during use. Hence, the weight of the reservoir does not rest on the beverage preparation module and is not vibrated thereby during use.

In accordance with the invention, the lid has a fastening arrangement for securing the reservoir against the beverage preparation module when the reservoir is assembled to the module.

The fastening arrangement of the lid can be configured to prevent or inhibit propagation of vibrations from the beverage preparation module to the reservoir during use.

This arrangement can include a fastening arrangement fixed to the lid and a cooperating arrangement on the beverage preparation module that are configured to: allow free movements of the beverage preparation module relative to the reservoir during use; and secure the reservoir to the beverage preparation module when the module is moved. Hence, in the operative configuration, the fastening arrangement does not rigidly connect the beverage preparation module to the reservoir and inhibits or prevents propagation of vibrations from the module to the reservoir.

The beverage preparation module is typically contained in an outermost housing with at least one upright wall, such as a rear wall opposite a beverage front outlet or a sidewall adjacent a beverage front outlet, the reservoir being located adjacent said upright wall. The outermost housing and the reservoir, in particular an upper part of the reservoir, may have an interlocking arrangement for securing the reservoir to the housing when the beverage preparation module is displaced and allow free relative movements of the beverage module relative to the reservoir during use.

BRIEF DESCRIPTION OF THE DRAWINGS

The invention will now be described with reference to the schematic drawings, wherein.

DETAILED DESCRIPTION

FIGS. 1 to 7*c* illustrate an embodiment of a beverage preparation machine 1 and parts thereof according to the invention, in particular a machine for preparing a beverage by circulating a liquid via a flavouring ingredient, e.g. tea or ground coffee, such as a pre-portioned ingredient contained in a capsule. Machine 1 is electrically powered and connected to the mains via an electric cord 33.

Machine 1 includes: a beverage preparation module 2 and a reservoir 4 for storing and supplying liquid, such as water, to the beverage preparation module. Typically, reservoir 4 is a water tank.

Figure 1:
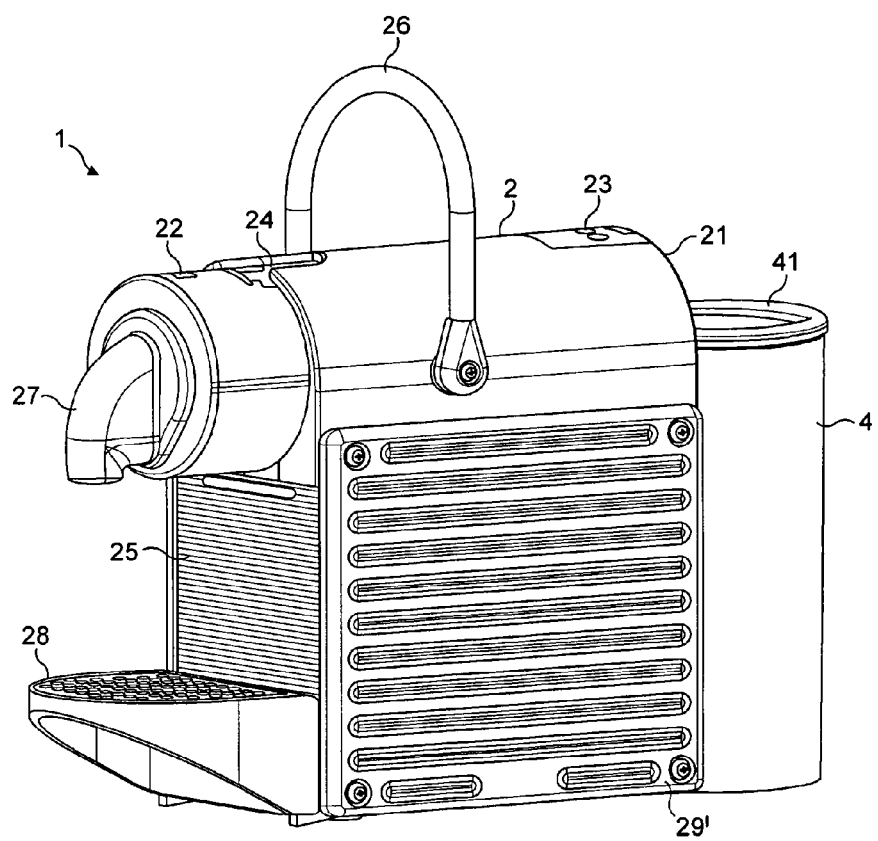
FIG. 1 is a perspective overall view of a beverage preparation machine in accordance with the invention.

Module 2 has a housing 21 that contains the module's functional units, such as a fluid circuit with a pump and a heater, a brewing unit 22, and a control unit connected to a user-interface 23 including for example push-buttons. The front part of brewing unit 22 may be configured to telescope into and out of housing 21 from a capsule loading/unloading open position to a capsule extraction closed position. In the loading/unloading position, as illustrated in FIG. 1, an ingredient capsule can be introduced into brewing unit 22 via capsule inlet 24 and evacuated from brewing unit 22 into a collector 25 for used capsules. A user-operable handle 26 is provided to move brewing unit 22 from the open to the closed position, i.e. to telescope the brewing unit's front part into and out of housing 21.

Furthermore, front part of brewing unit 22 leads to a beverage outlet 27 that is located above a cup support 28. Cup support 28 may be connected to a drip tray underneath used capsule collector 25 so that collector 25, cup support 28 and drip tray may be removed from and inserted into housing 21 as a unit. Cup support 28 may be pivotally mounted so as to be pivotable between a horizontal configuration, as shown in FIG. 1, for supporting small cups underneath outlet 27, and an upright configuration (not shown) to give way for placing large cups underneath outlet 27. Such pivotable cup supports and variations are disclosed in greater details in EP 1 867 260, the content of which is hereby incorporated by way of reference.

A beverage preparation machine of this type is described in greater details in WO 2009/043630 and in PCT/EP09/053139.

Figure 2:
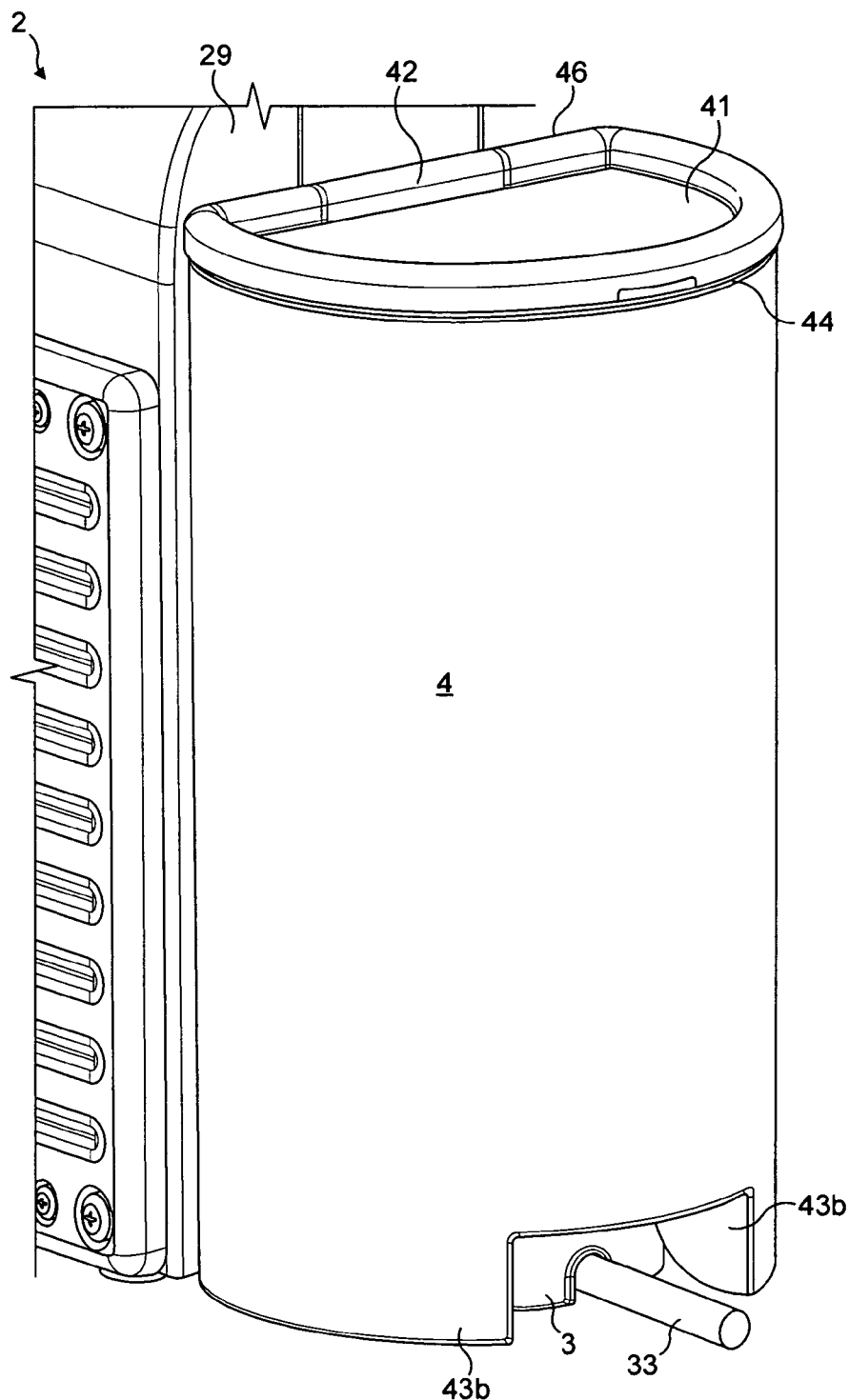
FIG. 2 is a perspective view of the reservoir assembled to the beverage preparation module of the beverage preparation machine of FIG. 1.
Figure 3:
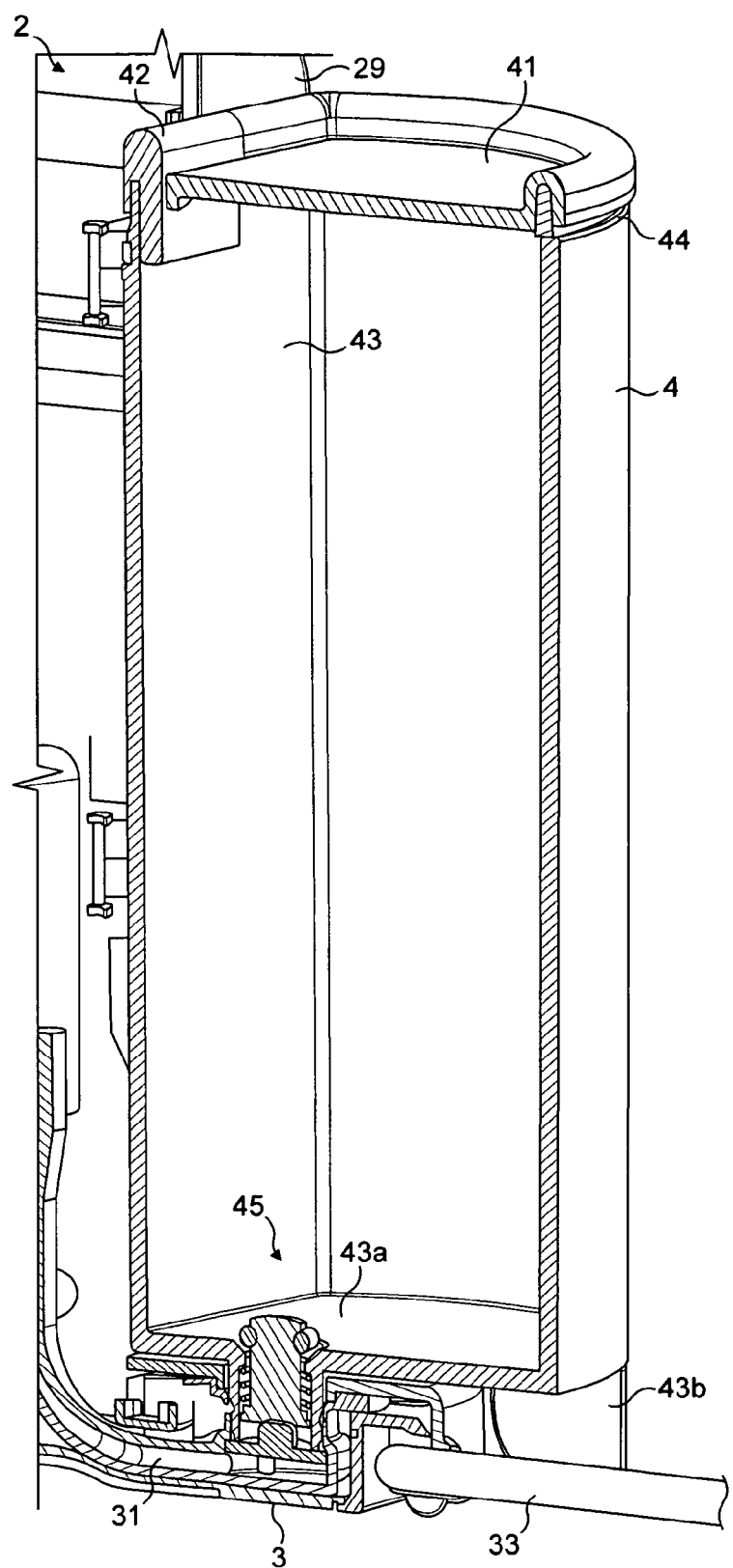
FIG. 3 is a cross-sectional perspective view of the reservoir and beverage preparation module shown in FIG. 2.

Reservoir 4 is arranged to store water or possibly another liquid, in particular a service liquid for a maintenance process, and is located adjacent housing 21, in particular adjacent an upright wall 29 of housing 21. As illustrated in FIGS. 1 to 3, upright wall 29 is a rear wall opposite beverage outlet 27. In a variation, the liquid reservoir may be located adjacent a sidewall of the module's housing, e.g. side panel 29'.

Reservoir 4 has a lid 41 that is pivotally mounted by a hinge 42 on upright reservoir wall 43. Rear wall 29 of module 2 faces reservoir wall 43. Moreover, lid 41 rests on rim 44 of reservoir 4.

Beverage preparation module 2 and reservoir 4 are brought in fluid connection by a disconnectable connecting assembly 31,45.

Figure 4:
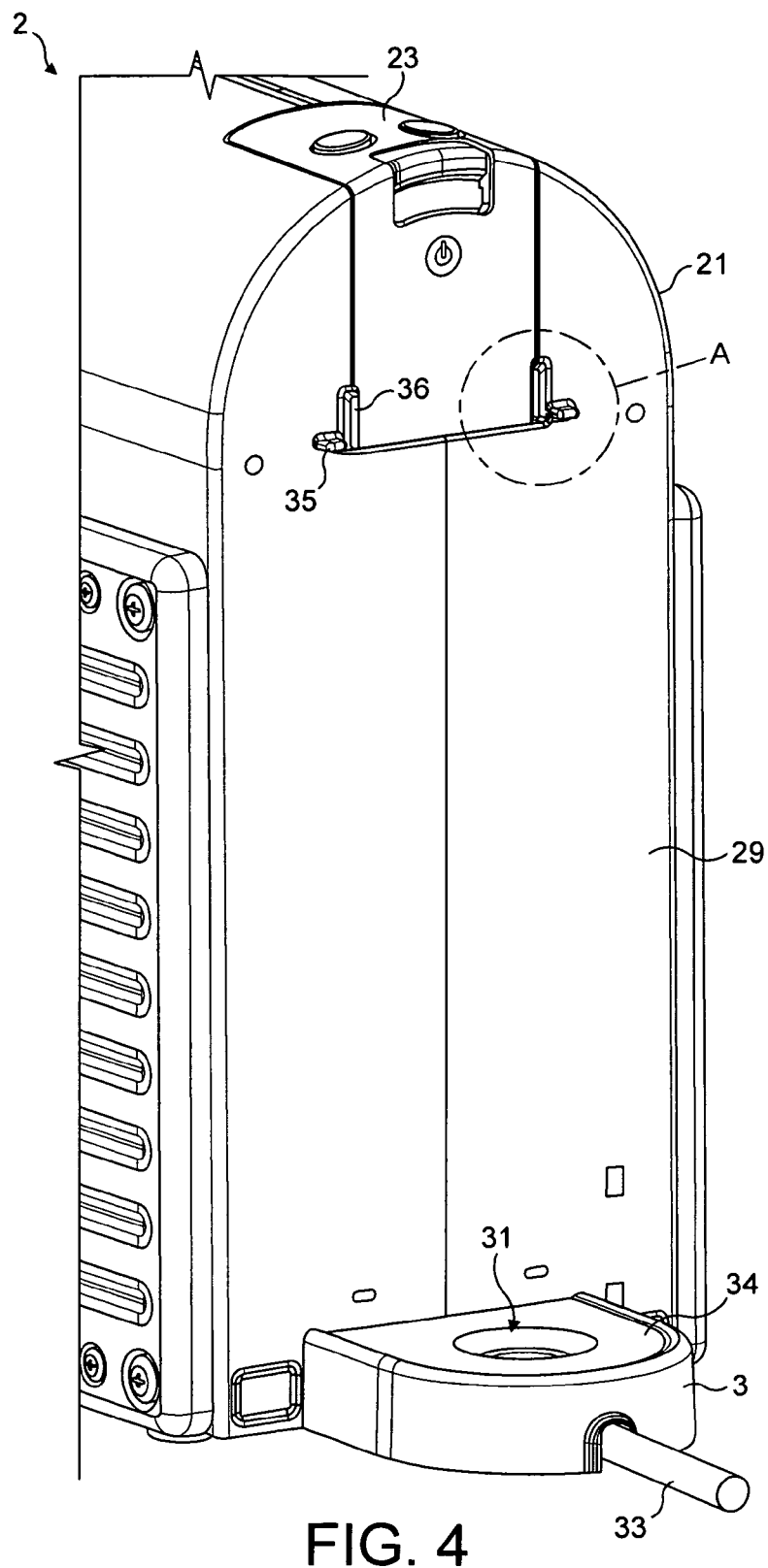
FIG. 4 is rear perspective view of the beverage preparation module of FIGS. 1 to 3 shown after removal of the reservoir.

As illustrated in greater details in FIGS. 3 and 4, connection assembly 31,45 comprises: a docking station 3 extending from beverage preparation module 2; and an outlet arrangement 45 extending from reservoir 4, in particular from a bottom 43*a* thereof. Docking station 3 includes a fluid line 31 whose inlet is located at the surface of docking station 3. When reservoir 4 is mounted onto docking station 3, outlet arrangement 45 is connected to the inlet of line 31. Line 31 is disconnectable from outlet arrangement 45 by removal of reservoir 4 from docking station 3.

Reservoir 4 has a foot 43*b* that may rest on an external support surface for supporting machine 1, e.g. on a table or a shelf, and may space bottom 43*a* of reservoir 4 above a top 34 of docking station 3. In a variation, bottom part 43*a* may rest on docking station 3 so that foot 43*b* is spaced above such an external support surface.

When beverage preparation module 2 with docking station 3 is lifted, e.g. to move beverage preparation machine 1, docking station 3 is used to support and carry reservoir 4.

In the particular embodiment shown in FIGS. 1 to 4, electric cord 33 is connected to machine 1, in particular to beverage preparation module 2 of machine 1, via docking station 3 and extends underneath reservoir 4 adjacent foot 43b to the mains. However, the electric connection of the beverage preparation machine may be provided at other locations of the machine. When beverage preparation machine 1 is lifted, cord 33 extending from docking station 3 underneath reservoir 4 does not interfere with reservoir 4.

In accordance with an aspect of the invention, lid 41 has a fastening arrangement 46 for securing reservoir 4 against beverage preparation module 2 when reservoir 4 is assembled to module 2. This aspect will now be discussed in greater details with particular reference to FIGS. 4 to 7c.

Lid 41 is permanently fixed to reservoir 4 via hinge arrangement 42 as mentioned above. On each side of hinge arrangement 42, lid 41 bears a fastening arrangement 46 at its periphery adjacent to rear face 29 of beverage preparation module 2. Lid 41 is fastened to beverage preparation module 2 for securing reservoir 4 to module 2; and unfastened from module 2 for removing reservoir 4 from module 2.

Figure 5:
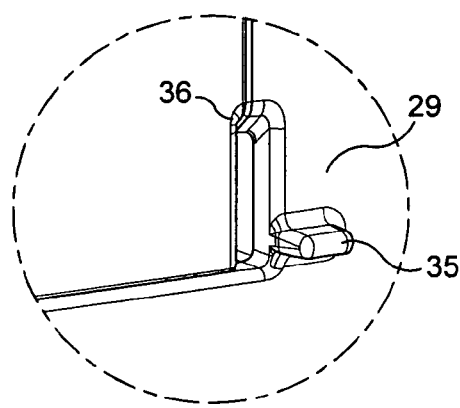
FIG. 5 is an enlarged view of a detail of FIG. 4.
Figure 6:
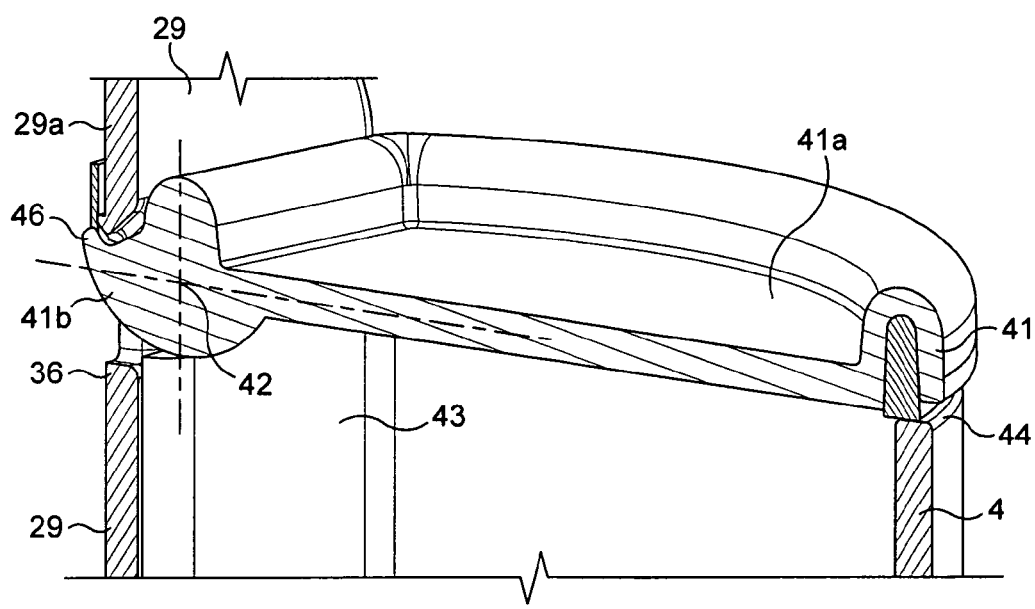
FIG. 6 illustrates in cross-section the interaction of the reservoir, the lid and the beverage preparation module of the machine shown in FIGS. 1 to 3.

As shown in FIGS. 4 to 6, FIG. 5 being a magnified view of Detail A of FIG. 4, fastening arrangement 46 and beverage preparation module 2 have disconnectable interconnecting parts 36,46. Lid 41 has a front portion 41a covering reservoir 4 and a rear portion 41b bearing fastening arrangement 46.

The disconnectable interconnecting parts comprise a pair of hooks 46 on lid 41 and corresponding hook-retainers 36 on beverage preparation module 2. Hook-retainers 36 are integral with wall 29 and delimit slots for hooks 46 which are dimensioned to pass through these slots and hook onto inwardly oriented face 29a of wall 29.

As mentioned above, base 3 of beverage preparation module 2 forms a support member arranged to support removable reservoir 4, in particular when beverage machine 1 is lifted via module 2, e.g. as disclosed in PCT/EP09/053139, the content of which is hereby incorporated by way of reference.

Base 3 cooperates with a pair of secondary members, e.g. protrusions 35, extending generally horizontally from upright wall 29. Secondary members 35 are configured to maintain removable reservoir 4 against base 3. Secondary members 35 are located adjacent slots of hook-retainers 36 in an upper part of reservoir 4. Members 35 extend into corresponding generally horizontal openings (not shown) in wall 43 of reservoir 4. These openings are in particular located in the top part of reservoir 4, e.g. recesses in rim 44 covered with lid 41 located immediately thereabove.

Lid 41 is configured to lock the assembly of removable reservoir 4 when held by base 3 and secondary countermember 35 of beverage preparation module 2. In the illustrated embodiment of the beverage preparation machine, the assembly constraints between module 2 and reservoir 4 are mainly located within bottom part 43a and sidewall 43 of reservoir 4 and within base 3 and protrusion 35 of module 2. Hooks 46 and hook-retainers 36 merely lock the assembly of reservoir 4 and module 2. No substantial assembly constraints extend through hooks 46 and hook-retainers 36. However, in a variation, it is possible to configure the hooks and hook-retainers so that they absorb all or a substantial part of the assembly forces between module 2 and reservoir 4. In particular, lid 41 with fastening arrangement 46 and cooperating arrangement 36 wedges reservoir 4 against beverage preparation module 2, in particular against support member 3 and secondary members 35.

Figure 7A:
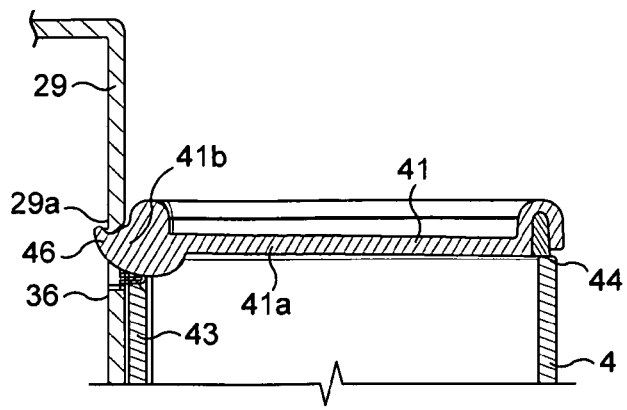
FIGS. 7*a* to 7*c* show, in cross-section, different positions of the reservoir, the lid and the beverage preparation module illustrated in FIG. 6.
Figure 7B:
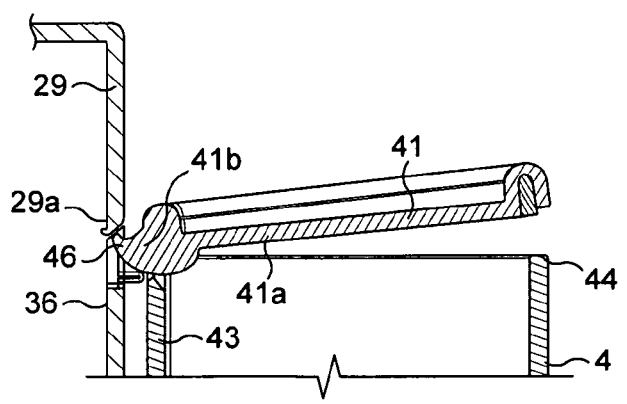
Figure 7C:
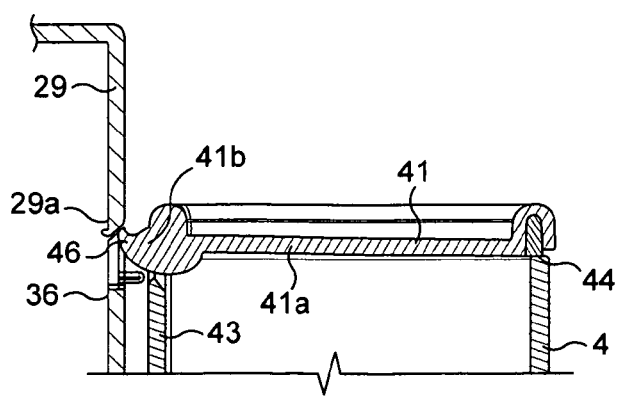

As illustrated in FIGS. 7a to 7c, interconnecting parts, namely hook 46 and hook retainer 36, are connected by closing reservoir 4 with the lid 41 when reservoir 4 rests on base 3 and against wall 29 (FIG. 7a). Interconnecting parts 36,46 are disconnected by opening reservoir 4 by pivoting up the lid 41 (FIG. 7b). Reservoir 4 can then be removed by pulling it away from module 2, in particular away from rear wall 29 and base 3 of module 2 (FIG. 7c).

Lid 41 is pivotable over an edge of reservoir 4, namely over the rear part of rim 44, to connect and disconnect the interconnecting parts. Hence, the bottom part of rear part 41b of lid 41 is arched to slide over the rear part of rim 44 when pivoted.

Lid 41 can be fastened to beverage preparation module 2 for securing reservoir 4 to module 2; and unfastened from module 2 for removing reservoir 4 from module 2.

In particular, as illustrated in FIGS. 2, 3 and 6 to 7c, lid 41 and fastening arrangement 46 are pivotally movable about a pivoting axis 42 for securing the reservoir 4 to the module 2 and for removing the reservoir 4 from module 2. Lid 41 and fastening arrangement 46 form a lever 41,46 pivotable about pivoting axis 42 for a force multiplication from the lid to the fastening arrangement. Hence, when lid 41 and fastening arrangement 46 are fastened against to module 2 the lever 41,46 formed thereby and the resulting leverage ratios between fastening arrangement 46 and lid 41 about pivoting axis 42 inhibits pivoting of lever 41,46 by an action on fastening arrangement 46. It follows that unfastening is inhibited by acting on reservoir 4 and/or module 2 along. Instead unfastening should be achieved by acting on lid 41 of lever arrangement 41,46.

In a variation, the lid can be made separable from the reservoir. The lid can be made pivotable over the rear wall of the reservoir without being hinged thereto. Hence, the lid can be: connected to the reservoir when the reservoir is assembled to the beverage preparation module; and disconnected or disconnectable from the reservoir when the reservoir is removed from the beverage preparation module. In this configuration, the lid may or may not be permanently connected to the module.

The invention claimed is:
1. A beverage preparation machine comprising:
a beverage preparation module;
a removable reservoir assembled to the beverage preparation module and disassemblable therefrom for removal; and
a lid for covering the removable reservoir, the lid having a fastening arrangement that secures the removable reservoir to the beverage preparation module when the removable reservoir is assembled to the beverage preparation module, the lid being fastened to the beverage preparation module to secure the removable reservoir to the beverage preparation module, and unfastened from the beverage preparation module to remove the removable reservoir from the beverage preparation module,
the fastening arrangement of the lid and the beverage preparation module comprising disconnectable interconnecting parts, the lid comprising a front portion covering the removable reservoir and a rear portion bearing the fastening arrangement, and the lid being pivotable between the front and rear portions along a first direction to connect the interconnecting parts, and along a second direction to disconnect the interconnecting parts.

2. The beverage preparation machine of claim 1, wherein the beverage preparation module comprises an outer housing, the fastening arrangement fastening the lid to the outer housing to secure the removable reservoir against the housing when assembled to the beverage preparation module, the housing having at least one of a rear face opposite the front face and a lateral face adjacent the front face, the removable reservoir extending over at least part of the rear face or the lateral face.

3. The beverage preparation machine of claim 1, wherein the lid is:
   connected to the removable reservoir when the removable reservoir is assembled to the beverage preparation module; and
   disconnected or disconnectable from the removable reservoir when the removable reservoir is removed from the beverage preparation module.

4. The beverage preparation machine of claim 1, wherein the lid is permanently fixed to the removable reservoir.

5. The beverage preparation machine of claim 1, wherein the lid and the fastening arrangement are pivotally movable about a pivoting axis for securing the removable reservoir to the beverage preparation module and removing the removable reservoir from the beverage preparation module.

6. The beverage preparation machine of claim 5, wherein the lid and the fastening arrangement form a lever pivotable about the pivoting axis to multiply a force from the lid to the fastening arrangement.

7. The beverage preparation machine of claim 1, wherein the disconnectable interconnecting parts comprise at least one hook and hook-retainer on the lid and on the beverage preparation module, respectively, the hook-retainer having slots for the hooks.

8. The beverage preparation machine of claim 1, wherein the beverage preparation module comprises a holding arrangement for holding the removable reservoir to form an assembly.

9. The beverage preparation machine of claim 8, wherein the lid locks the assembly of the removable reservoir when held by the holding arrangement of the beverage preparation module.

10. The beverage preparation machine of claim 8, wherein the holding arrangement comprises a support member, the support member supporting a bottom part of the removable reservoir by the beverage preparation module.

11. The beverage preparation machine of claim 10, wherein the holding arrangement comprises a secondary member, the secondary member maintaining the removable reservoir against the support member and being located in an upper part of the removable reservoir when assembled to the beverage preparation machine.

12. The beverage preparation machine of claim 1, wherein a bottom part of the beverage preparation module and a bottom part of the removable reservoir have disconnectably connected fluid connectors when the removable reservoir is assembled to the beverage preparation module.

13. The beverage preparation machine of claim 10, wherein the holding arrangement comprises a secondary member, the secondary member maintaining the removable reservoir against the support member and comprising a protrusion of the beverage preparation module cooperating with an opening of the removable reservoir, the opening being in particular located between the removable reservoir and the lid and being covered by the lid.

14. The beverage preparation machine of claim 10, wherein the holding arrangement comprises a secondary member, the secondary member maintaining the removable reservoir against the support member and being located on an upper part of the removable reservoir when assembled to the beverage preparation machine.

\* \* \* \* \*